(12) United States Patent
Young

(10) Patent No.: US 7,088,284 B2
(45) Date of Patent: Aug. 8, 2006

(54) PORTABLE PROXIMITY-SENSING SAFETY DEVICE

(75) Inventor: Jerry Young, Nampa, ID (US)

(73) Assignee: Preco Electronics, Inc., Boise, ID (US)

( * ) Notice: Subject to any disclaimer, the term of this patent is extended or adjusted under 35 U.S.C. 154(b) by 0 days.

(21) Appl. No.: 10/715,341

(22) Filed: Nov. 16, 2003

(65) Prior Publication Data

US 2005/0104764 A1 May 19, 2005

(51) Int. Cl.
  *G01S 7/40* (2006.01)
  *G08B 13/18* (2006.01)

(52) U.S. Cl. .............................. 342/27; 342/28; 342/53

(58) Field of Classification Search ................. 367/87, 367/93, 112, 116, 910; 342/27, 28, 53
See application file for complete search history.

(56) References Cited

U.S. PATENT DOCUMENTS

| 4,843,373 | A |   | 6/1989  | Trickle et al. ............. 340/540   |
| 4,897,630 | A | * | 1/1990  | Nykerk .................. 340/426.25   |
| 5,047,748 | A |   | 9/1991  | Trickle .................... 340/542   |
| 5,436,613 | A |   | 7/1995  | Ghosh et al. .............. 340/573    |
| 5,457,394 | A | * | 10/1995 | McEwan .................... 342/27     |
| 5,760,686 | A |   | 6/1998  | Toman ..................... 340/540    |
| 5,939,986 | A |   | 8/1999  | Schiffbauer et al. ...... 340/573.1    |
| 6,208,248 | B1 |  | 3/2001  | Ross ....................... 340/552   |
| 6,288,651 | B1 |  | 9/2001  | Souza ...................... 340/933   |
| 6,340,139 | B1 |  | 1/2002  | Hilleary ................... 246/292   |
| 6,351,234 | B1 |  | 2/2002  | Choy ........................ 342/53   |

FOREIGN PATENT DOCUMENTS

GB  2232800  * 12/1990

* cited by examiner

*Primary Examiner*—Daniel Pihulic
(74) *Attorney, Agent, or Firm*—Pedersen & Co., PLLC; Ken J. Pedersen; Barbara S. Pedersen

(57) ABSTRACT

A warning device in one embodiment includes a housing which is portable, the housing containing preferably a microwave transceiver operating as a proximity-sensing device, a stroboscopic lamp and/or a horn disposed in the housing in electrical connection with the sensing device for emitting a series of flashes and/or honks in response to the sensing of an object within predetermined range of the sensing device, a battery in the housing for powering the sensing device and the lamp and/or horn, and a system for mounting the housing to a variety of supporting objects.

3 Claims, 4 Drawing Sheets

PORTABLE PROXIMITY-SENSING SAFETY DEVICE

BACKGROUND OF THE INVENTION

1. Field of the Invention

The present invention relates generally to the field of personnel safety, and more specifically, the invention relates to a portable proximity-sensing system which serves to establish a safety zone for individuals engaged in activity near a potentially hazardous area. The portable proximity-sensing system alerts an individual near or within a safety zone that there has been undesirable breach of the safety zone.

2. Related Art

Following are some related art/technical paper references:

"Micropower Impulse Radar: 'Genie on a Chip' technology opens many new doors for U.S. industry" at URL http://www.lln1.gov/IPand C/op96/10/100-mic.html as of Nov. 28, 1998.

"Micropower Impulse Radar (MIR)" at URL http://www-lasers.lln1.gov/lasers/idp/mir/mir.html as of Nov. 11, 1998.

"Micropower Impulse Radar: MIR Technology Overview" at URL http://lasers.lln1.gov/lasers/idp/mir/overview.html as of Nov. 11, 1998.

"Micropower Impulse Radar: MIR FAQ'3" at URL http://lasers.lln1.gov/lasers/idp/mir/faqs.html as of Nov. 11, 1998.

"Micropower Impulse Radar"; Science & Technology Review January/February 1996; pp. 16–27.

"Micropower Impulse Radar: Electronic Trip Wire" at URL http://lasers.lln1.gov/lasers/idp/mir/tripwire.html as of Nov. 11, 1998.

"Micropower Impulse Radar: MIR Strip Proximity Sensor (Smart Wire)"at URL http://lasers.lln1.gov/lasers/idp/mir/smartwire.html as of Nov. 11, 1998.

In U.S. Pat. No. 5,436,613, "System for detecting human presence in hazardous locations," inventor Ghosh, et al. relates to a system for the detection of human presence in hazardous situations near moving machinery, where radiofrequency signal of appropriate frequency and voltage is applied to electrodes creating an electric field around them. If a foreign object is introduced into the field, the characteristics of the dielectric are modified creating a change of the value of the dissipation factor. Thus, the system detects human presence by noting the increase of the dissipation factor above a threshold value.

In U.S. Pat. No. 5,760,686, "Assembly and method for detecting errant vehicles and warning work zone personnel thereof," inventor Toman describes a system that incorporates a detector array with one or more transmitters for emitting pulsed infrared signals along the work zone perimeter and a strobe light array for announcing when a vehicle or object has crossed into the work area perimeter.

In U.S. Pat. No. 5,939,986, "Mobile machine hazardous working zone warning system," inventor Schiffbauer, et al. describes a system, which utilizes a transmitter with directional antenna loops strung along the machine so as to create a magnetic field that surrounds the machine. The warning system further includes, as another component, a receiver carried by an individual, which alarms when the user enters the working zone of the machine.

In U.S. Pat. No. 6,288,651, "Portable roadway perimeter alarm," inventor Souza describes a system that uses shock or impact sensors mounted into highway marker/warning cones or uses a pressure sensitive switch that is activated by running over a pneumatic hose to activate a radio beacon that warns workers of a work-zone perimeter violation.

In U.S. Pat. No. 6,340,139 B1, "A highway grade crossing vehicle violation detector," inventor Hilleary describes an alarm monitor for a railroad grade crossing, the grade crossing having an island activation relay that is activated in response to an approaching train, the alarm monitor including a micropower impulse radar (MIR) responsive to pedestrians and motor vehicles in a prohibited area of the crossing island during activations.

In U.S. Pat. No. 6,351,234, "Combination microwave passive infrared motion detector with anti-masking evaluation," inventor Choy describes a motion detector system with microwave and passive infrared sensors, with signal processing logic for initiating an anti-masking evaluation upon detection of certain conditions. The detector samples the sensor signals and compares the signals to a series of possible outcomes, where some of the possible outcomes represent masking conditions and others represent normal conditions. A match with masking conditions results in an alarm signal being generated.

SUMMARY OF THE INVENTION

The invention is a portable standalone proximity-sensing safety device. The device has a portable casing for housing preferably a microwave transceiver configured for and operating as a proximity sensor, the sensor being in electrical connection with a warning light and/or horn. The device also has an electrical power supply in the casing, and a means for mounting or supporting the device in or near a construction or work zone. If the safety device detects an intrusion in the construction or work zone, it initiates the warning light and/or horn. The mounting or supporting means permits the safety device to be movably and adjustably positioned in the construction or work zone for the best safety effect.

The movement of heavy equipment creates risk to workers both in vehicles and on the ground. One in four "struck by vehicle" deaths involve construction workers. There are many safety concerns about trucks and/or tractors, with or without trailers on roadways, as well as at loading docks.

The present invention is an alarm monitor for construction and work zones where an alarm is desired when personnel or objects enter a protected zone. The preferred alarm monitor embodiment includes a micropower impulse radar (MIR) sensor responsive to the presence of pedestrians, equipment and vehicles in a prohibited area, and a processor configured to generate a warning signal or signals.

It will be seen that embodiments of the present invention provide a cost-effective system for detecting and reporting instances of vehicles and pedestrians violating monitored areas. Using these embodiments, corporate and governmental authorities reduce the likelihood of accidents without waiting to compile accident statistics.

With respect to the technologies used to detect movement, motion sensors are primarily based on ultrasound, passive infrared (PIR) and radar detectors. Ultrasonic motion sensors are commonly used for automatic door openers and security alarms. They are of low cost and can operate with narrow beam widths. However, installation options are limited since ultrasonic beams are easily blocked by thin materials, including paper. Another shortcoming is the tendency to false trigger on reflections from typically non-target items such as blowing curtains or flying insects.

PIR sensors are perhaps the most frequently used security sensor. They utilize a special Fresnel lens to generate multiple thermal images of a warm object, such as a person. As the person traverses the field of view, the thermal images produce fluctuations as they sweep across an IR sensor element, which are then detected by low cost electronics. As with ultrasound, however, PIR can be blocked by a sheet of paper. Furthermore, PIR has no range adjustment.

FM-CW radar sensors emit a swept frequency microwave signal and compare the frequency of the echo with its current emission frequency, producing a beat frequency proportional to range. FM-CW radar sensors use low cost microwave oscillators and detector diodes, and audio frequency processing electronics to determine the audio beat frequency, or range. Non-ranging radar sensors simply emit a continuous microwave carrier and listen for a Doppler shift from a moving object. The antennas are usually low cost, die cast metal horns. Some downsides of FM-CW and Doppler radar are: limited materials penetration due to the high microwave frequencies employed, microphonics caused by the use of short radar wavelengths combined with audio frequency processing, frequency crowding, and poor short-range operation. Short range performance is limited by close-in noise sidebands in the transmit oscillator, since this variation would be indistinguishable from the desired beat frequencies. Therefore, while each of the above described technologies provides varying capabilities and performance and are included as possible detector classes within the scope of this invention, none of them are preferred for use as a motion detector. In the preferred embodiment of the present invention, a MIR circuit provides the means of moving vehicle or object detection. The MIR circuit, in the context of this invention, is considered to be a self-contained, functional circuit block. Other alternate embodiments, however, may incorporate any alternate detection means, including each of those means described above. As will be made evident in the following description, the detection circuit provides a detection signal output that drives an alarm device or circuit of several possible alternate types. These types may include a strobe or other lamp, a horn, or other type of alarming tone transducer. The detection signal may also trigger one or a series of radio transmissions to provide a remote alarm or multiple unit alarm capability. The referenced prior art can be categorized into three classes as follows:

Category 1: Detectors mounted to a fixed location.
Category 2: Detectors mounted to mobile working machines.
Category 3: Detectors fitted to a person.

The safety monitoring systems described by the referenced prior art often involve multiple discrete components that must be individually placed and configured so as to operate as a coherent system in order to properly accomplish the desired goal.

It is a purpose of the present invention to establish a category of safety monitoring equipment distinct from the three other categories described as prior art. This new category is open to those safety systems which utilize Portable Detectors. Category 4 detectors are freestanding; they are neither mounted to a fixed location, a mobile machine, nor are they fitted to a person.

While each of the references above provide alternative approaches that have their individual merits, none of the prior art was discovered to resemble the present invention, in that nowhere was disclosed a portable standalone detector device.

DETAILED DESCRIPTION OF THE INVENTION

Figure 1:
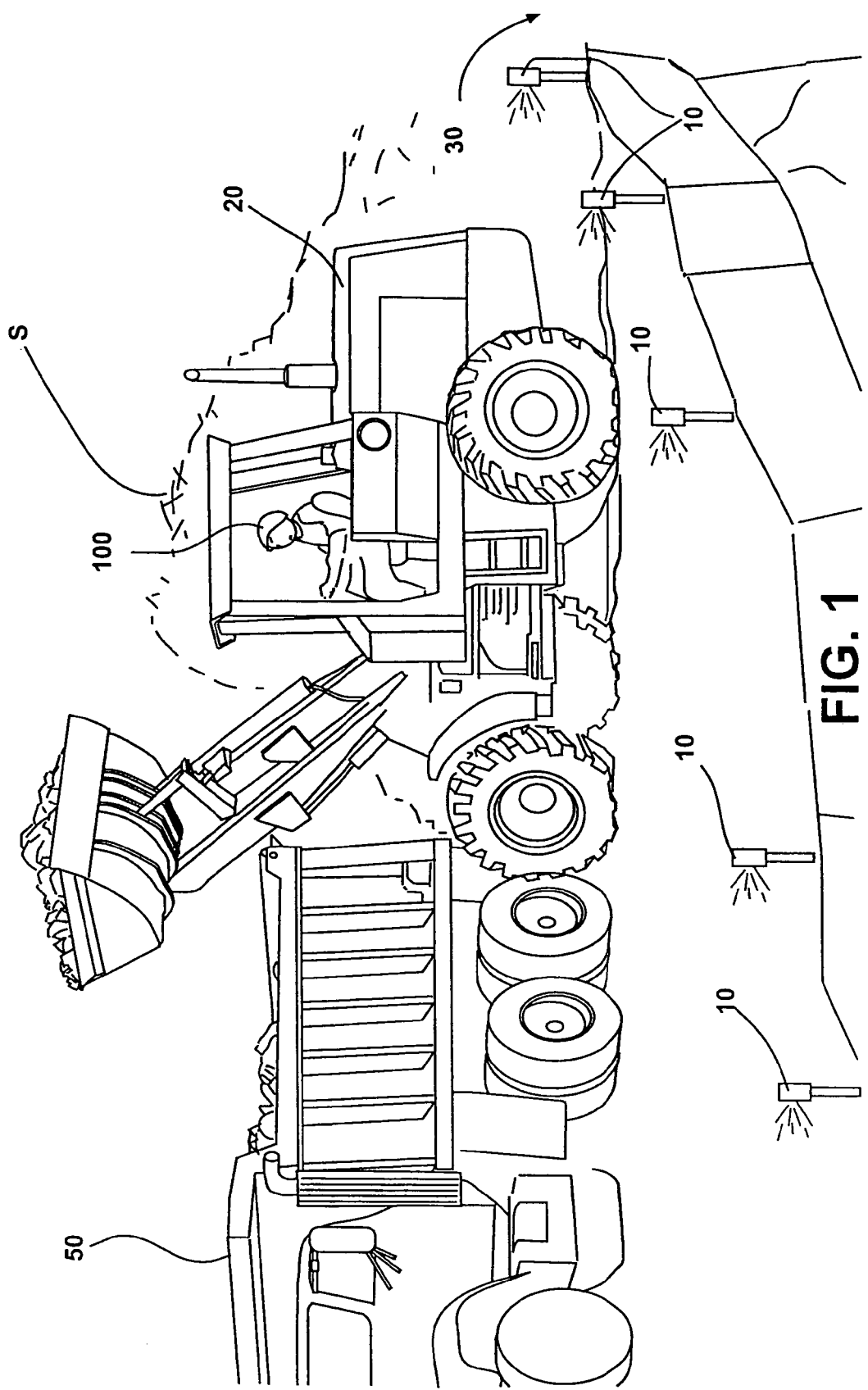
FIG. 1 depicts a plurality of Portable Safety Devices according to the present invention at the boundary of a hazardous area.

FIG. 1 depicts a plurality of Portable Safety Devices 10 at the boundary of a hazardous area. In this figure, the Portable Safety Devices 10 are arranged so as to alert the Operator 100 of a Mobile Working Machine 20 that said machine has entered an unsafe region. Having properly placed the Devices 10 at the boundary of a Hazard 30, the Operator 100 may proceed with the task at hand, namely that of transferring material from a Supply Mound 40 to Receiving Equipment 50, with confidence that, if the Machine 20 should come too close to the Hazard 30 an alarm would unmistakably indicate the unsafe situation.

Figure 2:
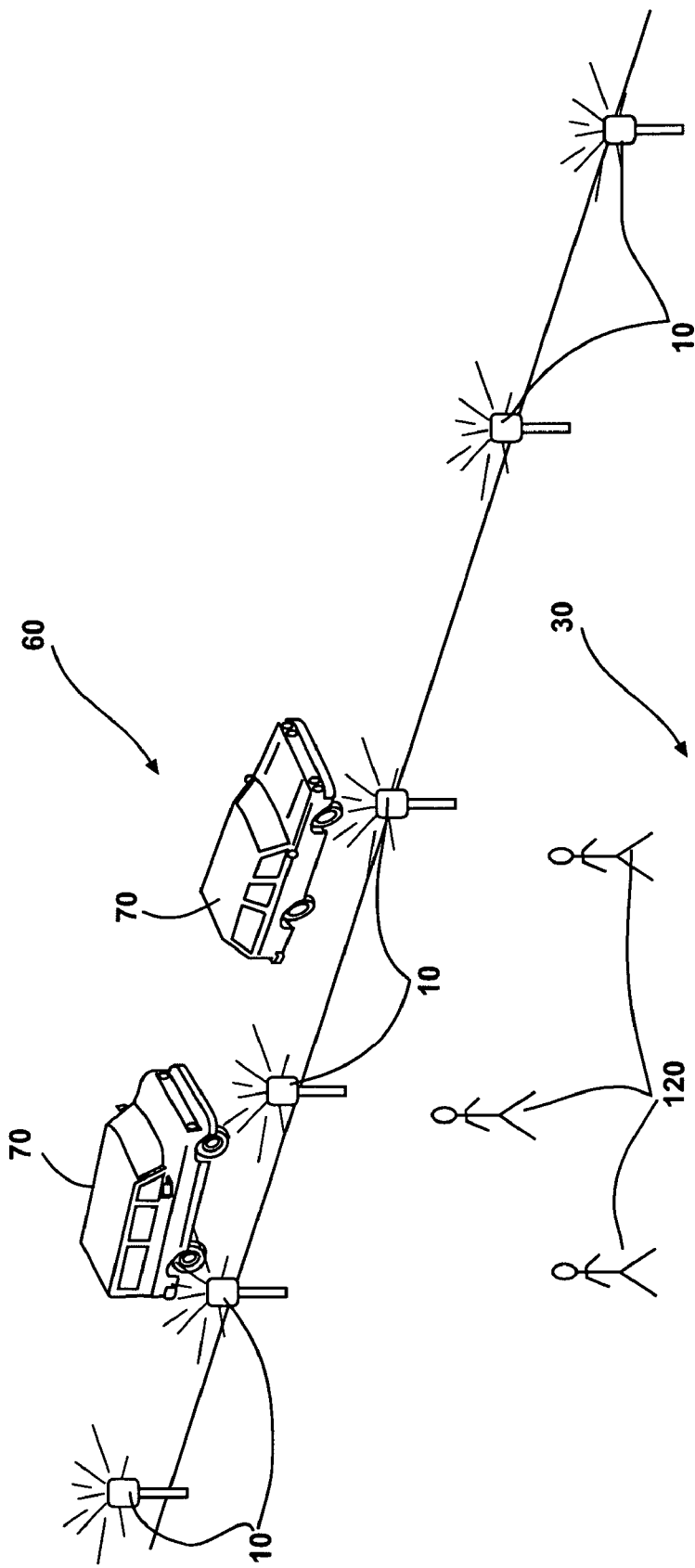
FIG. 2 depicts the use of a plurality of Portable Safety Devices according to the present invention at the boundary of a work area adjacent to a traffic area.

FIG. 2 depicts the use of a plurality of Portable Safety Devices 10 according to the present invention in a second embodiment whereby thee systems are arranged at the boundary of a Work Area 30 adjacent to a Traffic Area 60. Having properly placed the Devices 10 at said boundary, the Workers 120 may proceed with activity within the Work Area being confident that they will receive an unmistakable warning if any Traffic 70 should come too close to the Work Area 30.

While FIGS. 1 and 2 depict a plurality of Portable Safety Devices 10, in use, a single Safety Device 10 may be sufficient, depending on the boundary of the hazardous area. For example, for a stairway or sidewalk undergoing construction or repair, a single Safety Device 10 placed at each end of the stairway or sidewalk may be enough to provide adequate protection, depending on the size and shape of the detection zone for each Safety Device 10. This detection zone will be preferably determined by the design of each MIR detector, according to conventional techniques. Therefore, the desired detection zone will be defined by the MIR detector, so that the presence of an object entering the pre-determined, defined zone may be detected.

Also, for example, a single Safety Device 10 may be effective at the intersection of two walkways, or, for example, for a door or other entryway which opens immediately onto or into a work site.

Figure 3:
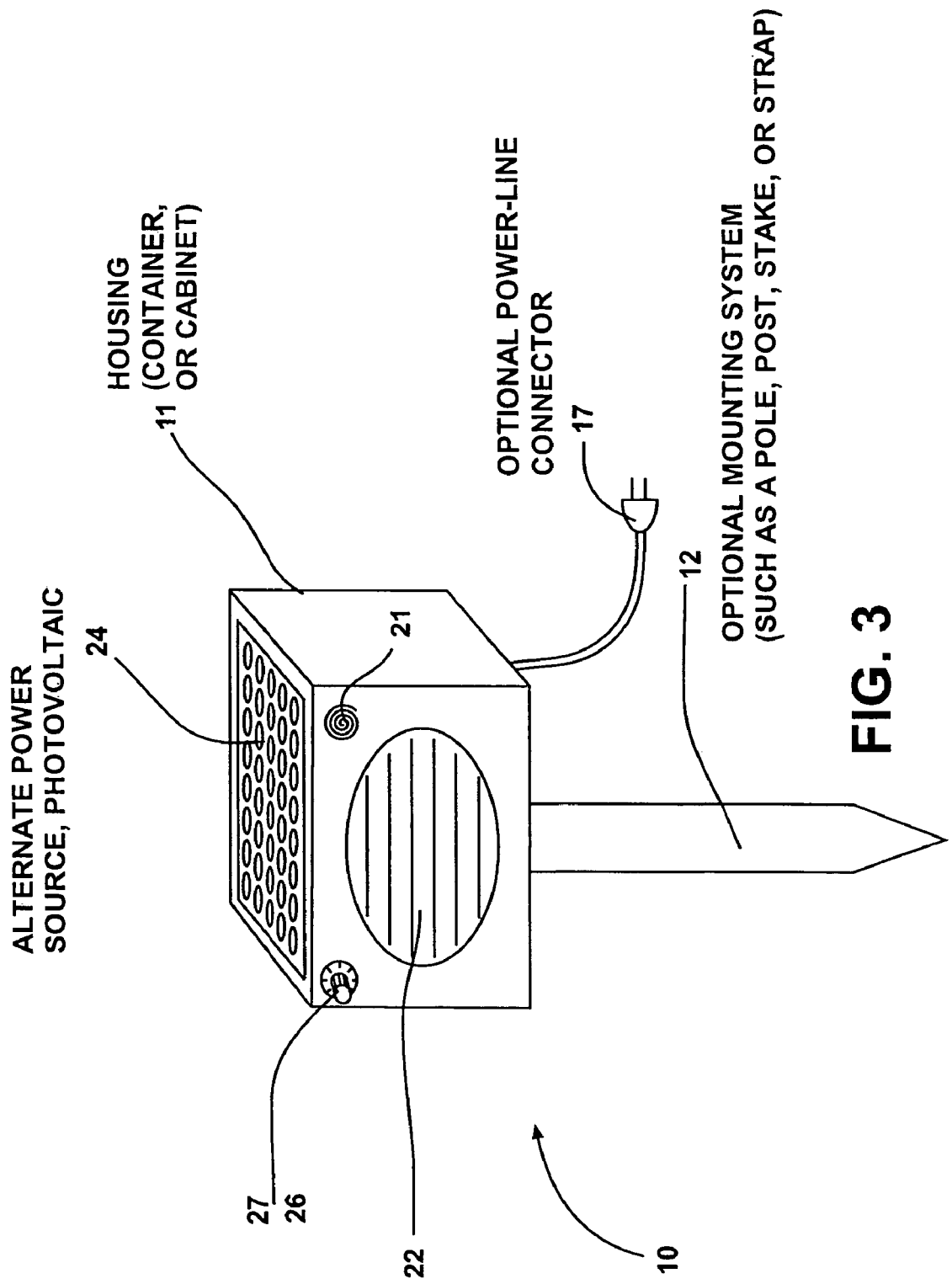
FIG. 3 is a schematic isometric view of one embodiment of the device of the present invention showing one possible arrangement of its component parts.

FIG. 3 is a schematic isometric view of one embodiment of a single Portable Safety Device 10 of the present invention showing one possible arrangement of its component parts. The Portable Safety Device 10 is comprised of a set of circuit elements that are incorporated into a Housing 11 that is mounted onto, for example, a Mounting Post or Bracket 12. The Housing 11 contains all of the circuit elements necessary to provide the functions of detection and alarming of intrusion into a protected area. The circuit elements that are visible from outside the housing include, but are not limited to, an on/off switch 27 and sensitivity control 26, an alternate power source 24 or power connector and cord 17, an alarm lamp and/or annunciation device 22, and a sensor head or detector 21. Other controlling, inputting or outputting devices can be similarly mounted so as to be made accessible to users. The housing also has means for mounting or supporting it in the construction or work zone, including, for example a flat base, a supporting stand, a strap, or a clamp or mounting bracket 12. This way, the Safety Device 10 may be portable, stand-alone and self-supporting. This is advantageous because then the Safety Device may be conveniently moved about the work site, and effectively placed where it provides the best protection. This portability is provided by the housing containing all of the detector, power source and alarm signaler within it.

Figure 4:
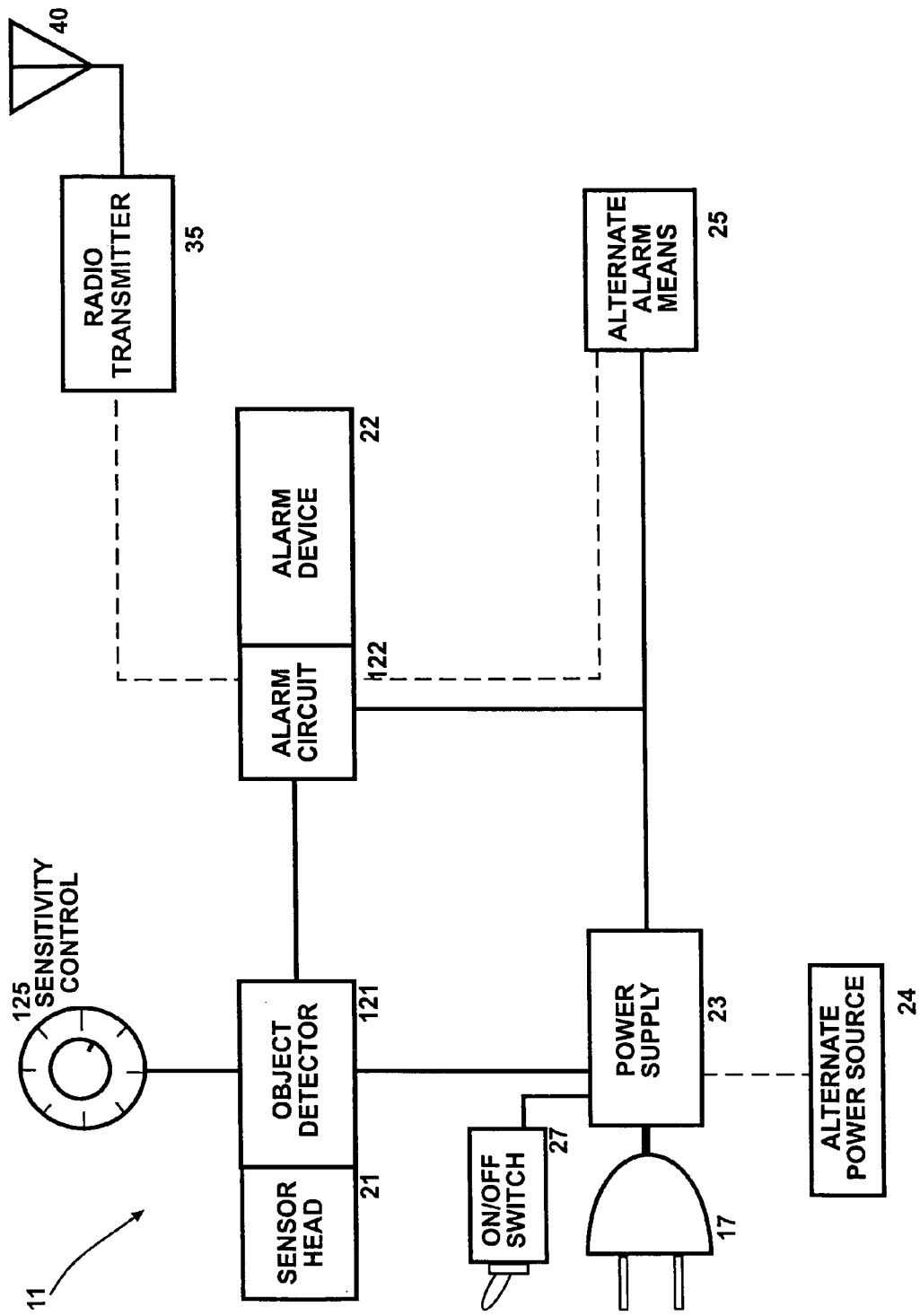
FIG. 4 is a schematic block diagram of circuit elements of a preferred embodiment of the invention.

FIG. 4 is a schematic block diagram of circuit elements of a preferred embodiment of the invention. Detector sensor head 21 is a device that picks up movement, and converts the movement to electrical impulses or variable voltages which are then processed by the object detector circuit 121. In the preferred embodiment, this detection device 21 is a radar horn or small microwave antenna and object detector 121 consists of impulse transmitter and receiver detector circuits, with quadrature signal outputs.

Preferably, MIR object detectors 121 provide an advantageous configuration in that they have a combination of adjustable ranging and a relatively precise zone of coverage (i.e., a relatively precise angular coverage). Thus, detection system 11 has a rather sharply defined detection zone that is more resistant to spurious alarms and more sensitive to actual intrusions into prohibited area than systems using standard microwave security intrusion sensors. Furthermore, the accuracy and repeatability using MIR object detectors 121 is greater than that obtainable using standard microwave security intrusion sensors, or infrared and light beam/photocell sensors. Unlike these sensors, MIR object detectors 121 are resistant to ice, snow, rain, and dust that can render these other sensors inoperative. Also, unlike buried loops, which are difficult to install and maintain, pedestrian (and bicycle) traffic is readily detected.

Sensitivity control 125 allows a user to adjust a variable proximity trigger to establish a threshold distance that is closer to or further away from the sensor head 21. The signal from object detector 121 is fed into the alarm circuit 122, which may incorporate a microcontroller to perform analysis of the detector data and generate output results of differing data formats. The alarm circuit 122 can generate single alarms, repeated or pulsed alarms, data packets or other types of data, as required to operate any of multiple alarm devices 22, 25. These devices 22, 25 could include visible or infrared lamps, strobe lights, bells, horns or other annunciating output devices. In the preferred embodiment, the alarming device consists of a strobe lamp, plus an audible alarm. One or more suitable alternate alarm means 22, 25 may be employed at a time. A radio transmitter 35 will be able to send data by means of a transmitting antenna 40. A power supply 23 that supplies power to the entire circuit 11 comprises batteries or power conversion for AC power via cord and plug connection 17. On/Off switch 27 is of any commonly available type, and an alternate power source 24 could act as a power collector and battery charger.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A personnel safety system, comprising:
a portable proximity sensor, wherein said proximity sensor is a microwave impulse (MIR) sensor;
said proximity sensor being self-contained within a portable housing unit and comprising an electrical power source, a signaling device and means for operatively coupling electrical power from the power source to the proximity sensor and to the signaling device;
said proximity sensor being portably placed near or within a personnel safety zone, said proximity sensor not being mounted to a mobile working machine nor fitted to a person; and said proximity sensor being adapted to alert a person within said safety zone, via said signaling device, of an intrusion into the safety zone.

2. The safety system of claim 1 wherein there is a plurality of proximity sensors.

3. The safety system of claim 1 wherein the signaling device is a combination warning light and horn.

* * * * *

UNITED STATES PATENT AND TRADEMARK OFFICE
Certificate

Patent No. 7,088,284 B2
Patented: August 8, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jerry Young, Nampa, ID (US); and Fred Wilson, Boise, ID (US).

Signed and Sealed this Fifth day of May 2009.

PETER M. POON
*Supervisory Patent Examiner*
Art Unit 3643